UNITED STATES PATENT OFFICE.

MAXIMILIAN CARL LUDWIG ALTHAUSSE, OF BILLWÄRDER-AN-DER-BILLE, GERMANY, ASSIGNOR TO FABRIK CHEMISCHER PRAEPARATE VON DR. RICHARD STHAMER, OF HAMBURG, GERMANY.

PROCESS OF OBTAINING HYDROCELLULOSE.

SPECIFICATION forming part of Letters Patent No. 679,204, dated July 23, 1901.

Application filed August 27, 1900. Serial No. 28,200. (No specimens.)

*To all whom it may concern:*

Be it known that I, MAXIMILIAN CARL LUDWIG ALTHAUSSE, a subject of the German Emperor, and a resident of Billwärder-an-der-Bille, near Hamburg, in the German Empire, have invented certain new and useful Improvements in the Process of Obtaining Hydrocellulose, of which the following is a specification.

In the specification of my application for Letters Patent filed on the 27th day of August, 1900, Serial No. 28,199, simultaneously with the present application, I have described a process by means of which in a simple manner and within short time large quantities of cellulose may be converted into hydrocellulose by treating raw cellulose at a temperature of about 60° to 70° centigrade with hydrochloric acid and minute quantities of chlorate of potassium. The hydrocellulose thus obtained is distinguished from that produced in the manner hitherto known not only by its beautiful white color and purity, but also by its particularly suitable condition for further technical utilization and the possibility of being easily finely pulverized.

In the further course of experiments I have succeeded in obtaining a hydrocellulose perfectly different from that above mentioned and furnished with essentially valuable chemical properties. It is particularly distinguished from the former by the property of forming acetylic derivates, which are remarkable by their perfect solubility in water and alcohol.

The process consists in that instead of hydrochloric acid and chlorate of potassium the reaction is accomplished in glacial acetic acid, which is nearly saturated with chlorin.

This process is expediently performed in the following manner: Chlorin is introduced into glacial acetic acid until the latter has received a yellow color, whereby a perfect saturation of the glacial acetic acid is not necessary, inasmuch as only minute quantities of chlorin are consumed. After the glacial acetic acid is heated up to 65° to 70° centigrade the cellulose previously shredded or reduced to a fibrous condition is fed therein. In view of the whole mass then becoming very voluminous and difficult to stir by an agitator it is advantageous to use the glacial acetic acid in a quantity four to five times of that of the cellulose to be treated. When the temperature is then held uniformly upon 65° to 70° centigrade and the mass thoroughly mixed by means of a suitable agitator, the mass will collapse after a short while.

In order to prevent oxidation, which is perceptible of the glacial acetic acid growing brown, it is not advisable to exceed the aforesaid temperature. The duration of the reaction varies according as a soft or hard cellulose, or a cellulose reduced to a more or less fibrous condition, is employed, and the process is finished when the mass is grown to a thin pulp, which when at rest precipitates to the bottom of the vessel. The pulpy precipitate is then freed from glacial acetic acid, by centrifugal action, after which the hydrocellulose is thoroughly washed in water, dried at a temperature of about 70° centigrade, and finally pulverized. The glacial acetic acid removed can of course be used over again and does not require to be treated with chlorin. The thus-obtained hydrocellulose forms a pure white sandy powder of great resisting power against acids and alkalies. It possesses great similarity to the hydrocellulose produced by means of hydrochloric acid and chlorate of potassium. Nevertheless it is in certain points substantially distinguished from the latter. So, for instance, by way of a certain process acetylic derivates of specific chemical and physical properties may be produced by using hydrocellulose produced according to this invention, while the product obtained by means of hydrochloric acid and chlorate of potassium does not at all react under the same conditions. Also its behavior toward concentrated fuming nitric acid shows the same differences.

The hydrocellulose obtained by means of glacial acetic acid readily dissolves in nitric acid to a clear reddish-brown liquid, from which water precipitates a magnificent nitro compound with a bright ivory-like surface. The hydrocellulose produced with the aid of hydrochloric acid is but slightly soluble in nitric acid and the nitro compound obtained is of less brilliant appearance.

Attempts have of course been made to produce hydrocellulose by treating cellulose only with acetic acid without addition of chlorin. (See *Annales de Chimie et de Physique*, series 5, Vol. 24, page 252.) According to the process therein described the reaction is caused by acetic-acid vapors at 110° centigrade in a closed vessel and a hydrocellulose obtained which is always more or less dark-colored and, for instance, not applicable for photographic purposes, while under addition of chlorin a brilliant white easily-pulverizable hydrocellulose is obtained at a considerable less temperature and in open vessels. In the same manner hydrocellulose may be also obtained when acetic acid is mixed with iodin instead of chlorin. (See Cross-Bevan, *Cellulose*, page 37, London, 1895.) Hereby the acetic acid must, however, be used in the form of the anhydrids, whereby an acetylic compound, forming a tri-acetate, is obtained, which is soluble in acetone. In view of the high price of the anhydrous acetic acid and of the iodin, as well as the fact that the agents employed in this process do not admit their reuse, the process is of no practical value. If instead of the anhydrous acid glacial acetic acid and iodin are employed, no acetylic compound at all is obtained, but a hydrocellulose, the outer appearance of which is in no way different from the initial cellulose. It shows a fibrous structure and is not pulverizable. This process must also be performed at high temperatures and in closed vessels, and the product obtained is strongly colored by the iodin and may be only difficultly purified.

Having fully described my invention, what I claim, and desire to secure by Letters Patent, is—

1. The process of obtaining hydrocellulose which consists in reacting upon cellulose with chlorinated glacial acetic acid while being heated to a non-oxidizing temperature, substantially as set forth.

2. The process of obtaining hydrocellulose which consists in reacting upon cellulose with glacial acetic acid containing free chlorin at a temperature of from 60° to 70° centigrade, and agitating the mixture during reaction, substantially as and for the purpose set forth.

MAXIMILIAN CARL LUDWIG ALTHAUSSE.

Witnesses:
HERM. SCHMIDT,
MAX LEMCKE.